United States Patent [19]
Okumura

[11] Patent Number: 6,160,688
[45] Date of Patent: Dec. 12, 2000

[54] MAGNETO-RESISTIVE COMPOSITE HEAD AND A MAGNETIC DISK DEVICE, HAVING GROUNDED MAGNETIC SHIELDING LAYERS

[75] Inventor: Toshiyuki Okumura, Tokyo, Japan

[73] Assignee: NEC Corporation, Tokyo, Japan

[21] Appl. No.: 09/210,390

[22] Filed: Dec. 14, 1998

[30] Foreign Application Priority Data

Dec. 16, 1997 [JP] Japan ................................ 9-346304

[51] Int. Cl.⁷ ................................ G11B 5/40; G11B 5/39
[52] U.S. Cl. .................... 360/323; 360/317; 360/319
[58] Field of Search ............................. 360/113, 319, 360/323, 317

[56] References Cited

U.S. PATENT DOCUMENTS

| | | | |
|---|---|---|---|
| 5,757,590 | 5/1998 | Phipps et al. | 360/113 |
| 5,761,009 | 6/1998 | Hughbanks et al. | 360/113 |
| 5,771,141 | 6/1998 | Ohtsuka et al. | 360/113 |
| 5,991,121 | 11/1999 | Kanda | 360/104 |
| 5,995,328 | 11/1999 | Balakrishnan | 360/104 |

FOREIGN PATENT DOCUMENTS

| | | |
|---|---|---|
| 7-73419 | 3/1995 | Japan . |
| 9-63019 | 3/1997 | Japan . |

*Primary Examiner*—Jefferson Evans
*Attorney, Agent, or Firm*—Young & Thompson

[57] ABSTRACT

To provide an MR composite head wherein damage of an MR element due to discharge of the static electricity is surely prevented with a simple configuration without degrading reproduction performance of the MR composite head, a first and a second magnetic shield layer (14 and 17), whereby the MR layer (20) is sandwiched, are designed to be grounded through a suspension (25). In an embodiment, a conductive member (24) is formed at an upper surface (11*b*) of the MR composite head (11) opposite to a facing surface (11*a*) facing to a magnetic disk (31), for electrically connecting the first and the second magnetic shield layer (14 and 17) to a slider (12) which is electrically connected to the suspension (25).

5 Claims, 6 Drawing Sheets

MAGNETO-RESISTIVE COMPOSITE HEAD AND A MAGNETIC DISK DEVICE, HAVING GROUNDED MAGNETIC SHIELDING LAYERS

BACKGROUND OF THE INVENTION

The present invention relates to a magneto-resistive composite head having a structure for evading damage of its magneto-resistive element caused by discharge current generated at read/write movement, and a magnetic disk device having the same.

Along with recent development of large capacity and high density magnetic disk devices, reproduction output of magnetic recording media becomes finer and finer, and magneto-resistive composite heads, which have advantage for detecting the fine reproduction output, are to be used widely.

In the magneto-resistive composite head, comparatively large reproduction output can be obtained making use of the magneto-resistive effect, independent of head speed relative to the recording medium.

FIG. 5 is a perspective view illustrating a conventional example of a magnetic disk device provided with magneto-resistive composite heads. The magnetic disk device comprises a magnetic recording medium (a magnetic disk) 31 rotatably supported around an axis A, a magneto-resistive composite head (hereinafter simply called the composite head) 42. The composite head 42 is unitized in a slider 12 and supported by a suspension 44 movable in a quasi-radial direction of the magnetic disk 31 for reading/writing information on a recording surface thereof. The suspension 44 is driven by an actuator 47 by way of a fixation arm 45 and a carriage 46. In the magnetic disk device of FIG. 5, a head amplifier 48 is provided at a side surface of the actuator 47 for amplifying the read/write signal.

The slider 12, the suspension 44, the actuator 47 and the magnetic disk 31 are connected electrically with each other and maintained at the same potential by way of a housing (not depicted in the drawings) whereby they are mounted and covered.

With rotation movement of the magnetic disk 31, the slider 12 moves relative to the disk surface, flying up or sliding on the disk surface in a circumference direction thereof, and moves in the radius direction according to rotation of the carriage 46, whereby the composite head 42 is positioned on a necessary point of the disk surface for reading/writing information on the recording surface of the magnetic disk 31.

FIG. 6 is a magnified sectional view of the composite head 42 which is configured making use of a thin film forming process at a side surface of the slider 12 made of a conductive material.

Referring to FIG. 6, the composite head 42 comprises a first insulation layer 13, a first magnetic shield layer 14, a second insulation layer 16, a second magnetic shield layer 17, a magnetic pole layer 18, and a third insulation layer 19, laminated in the order from the side surface of the slider 12.

The second magnetic shield layer 17 functions as a second magnetic pole layer as well, and compose a magnetic core of the recording element of the composite head 42 together with the magnetic pole layer 18. Between the first magnetic shield layer 14 and the second magnetic shield layer 17, a magneto-resistive element (hereinafter called the MR layer) 20 is configured so as to align with a facing surface 11a of the composite head facing to the recording surface of the magnetic disk 31.

The second magnetic shield layer 17 is configured as a straight plane and the magnetic pole layer 18 is configured as a concave plane, so as to create a space between them, wherein a fourth insulation layer 21 is configured. The second magnetic shield layer 17 and the magnetic pole layer 18 are magnetoelectrically connected with each other at their upper (of the drawing) ends, and their lower ends are aligned with the facing surface 11a being separated a little so as to make a magnetic gap 23. Traversing the third and the fourth insulation layer 19 and 21, a write coil 22 is configured and the write signal flows therein. To the MR layer 20, lead patterns (not depicted in the drawings) are connected for supplying a sense current, which generates reproduction voltage to be amplified by the read/write amplifier 48 according to resistivity variation of the MR layer 20.

By supplying the write signal current to the write coil 22 of the composite head 42 thus configured, magnetic information is recorded on the magnetic disk 31 with a magnetic field generated around the magnetic gap 23, and the recorded magnetic information is reproduced by supplying the sense current to the MR layer 20 through the lead patterns.

There are magnetic recording devices employing a near-contact read/write system wherein the composite head 42 is intermittently contacting with the magnet disk 31, or a contact read/write system wherein the composite head 42 is always contacting with the magnetic disk 31. By employing these read/write systems, a space between the facing surface 11a and the magnetic disk 31 is designed as narrow as possible for enlarging magnetic field intensity to be detected by the MR layer 20.

Here, the surface of the magnetic disk 31 is usually covered with an insulation material such as a protection film or a lubricant film, and it is the same with the facing surface 11a of the composite head 42. Therefore, certain static electricity is charged between the facing surface 11a and the magnetic disk 31, due to their direct friction or their friction with air molecules flowing between them, especially in the magnetic disk devices employing the above contact or near-contact read/write systems.

The composite head 42 is flying or sliding on the magnetic disk 31 separated with a space smaller than 0.1 $\mu$m. Therefore, the charged static electricity is discharged through the MR layer 20 when its potential becomes higher than a breakdown voltage of the air (about 3.5 kV/$\mu$m, at 20° C., 1,013 hectopascal) or of the protection/lubrication film.

The electric discharge generally occurs towards a narrowest point of the insulation space or towards a good conductor such as metallic material. Therefore, in the composite head 42 having such a structure as illustrated in FIG. 6, the static electricity is easy to be discharged through the MR layer 20 which is connected to the ground by way of a good conductor of the lead patterns.

Furthermore, thickness of the second insulation layer 16 between the MR layer 20 and the first or the second magnetic shield layer 14 or 17 is very thin and within 0.3 $\mu$m, for example. Therefore, electric discharges occurring towards the first or the second magnetic insulation layer 14 or 17, or towards the magnetic pole layer 18, which is electrically connected to the second magnetic shield 17, may also cause discharge current flowing through the MR layer 20 to the ground.

Thickness of the MR layer 20 is usually within about 30 nm and width thereof is within about 2 $\mu$m. Therefore, discharge current flowing in the very small cross section of the MR layer 20 may cause sufficient heat, even when its current value is small, for melting and breaking the MR layer 20, resulting in loss of the reproduction function of the composite head 42.

For preventing this damage of the reproduction head, especially of the MR layer thereof, due to the discharge current, some devices have been proposed.

In a Japanese patent application laid open as a Provisional Publication No. 63019/'97 (hereinafter called the first prior art), there is disclosed a magnetic head provided with a grounding member, or a discharge arrestor, at a position nearest to the magnetic disk, for by-passing discharge current from the magnetic disk to the ground. In an composite head disclosed in another Japanese patent application laid open as a Provisional Publication No. 73419/'95 (hereinafter called the second prior art), each one of the first and the second magnetic insulation layer 14 and 17 of FIG. 6 is so configured as to contact with each different one of the lead patterns of the MR layer 20 for preventing the discharge current flowing through the MR layer 20.

In the first prior art, the first magnetic shield layer 14 and the second magnetic shield layer 17 connected with the magnetic pole layer 18 of FIG. 6 are both electrically floating to the ground, and hence, the static electricity charged in the composite head 42 is easy to be discharged through the MR layer 20. Further, when the grounding member is not correctly positioned, discharge may occur to the MR layer 20 from the good conductors of the first magnetic shield layer 14 or the second magnetic shield layer 17 and the magnetic pole layer 18, or also direct discharge from the magnetic disk 31 to the MR layer 20 may occur depending on flying posture of the magnetic head at the CSS (Contact Start Stop) or the sliding. Still further, the grounding member is to be provided on the facing surface 11a at a position nearest to the magnetic disk 31, which means other elements including the MR layer 20 should be more separated than necessary from the magnetic disk 31, resulting in degradation of sensitivity and the resolution ability of the magnetic head.

In the second prior art, complicated film growth processes are needed for configuring each of the first and the second magnetic shield layer 14 and 17 to contact with each one of the lead patterns, resulting in a high production cost of the composite head.

SUMMARY OF THE INVENTION

Therefore, a primary object of the present invention is to provide a magneto-resistive composite head wherein damage of the MR element due to discharge of the static electricity is surely prevented with a simple configuration without degrading reproduction performance of the magneto-resistive composite head, and to provide a magnetic disk device having high reliability making use of the magneto-resistive composite head.

In order to achieve the object, in a magneto-resistive composite head of the invention having a reproduction head comprising a magneto-resistive element provided between a first and a second magnetic shield layer formed on a side surface of a slider supported by a suspension; the first and the second magnetic shield layer are designed to be grounded through the suspension.

In an embodiment of the invention, the magneto-resistive composite head comprises a conductive member formed at an upper surface of the magneto-resistive composite head opposite to a facing surface facing to a magnetic disk, for electrically connecting the first and the second magnetic shield layer to the slider which is electrically connected to the suspension.

In another embodiment, the magneto-resistive composite head comprising conductive resin adhering to the upper surface of the magneto-resistive composite head, for electrically connecting the first and the second magnetic shield layer to the slider.

The suspension may be designed to connect electrically to the first and the second magnetic shield layer at the upper surface of the magneto-resistive composite head.

Therefore, the first and the second magnetic shield layer neighboring to the magneto-resistive element are grounded through good conductors, and hence, even when the static electricity charged in the magnetic disk is discharged towards the magneto-resistive composite head, the discharge current is grounded without affecting the magneto-resistive layer, and therefore, the magneto-resistive layer can be surely prevented from break or degradation due to melting because of the discharge current, enabling to heighten reliability of the magnetic disk device.

Furthermore, the spacing between the magneto-resistive layer and the magnetic disk can be still reduced, evading as well the electric discharge towards the magneto-resistive layer, which enables further improvement of the resolution ability and consequently, recording density of the magnetic disk device.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
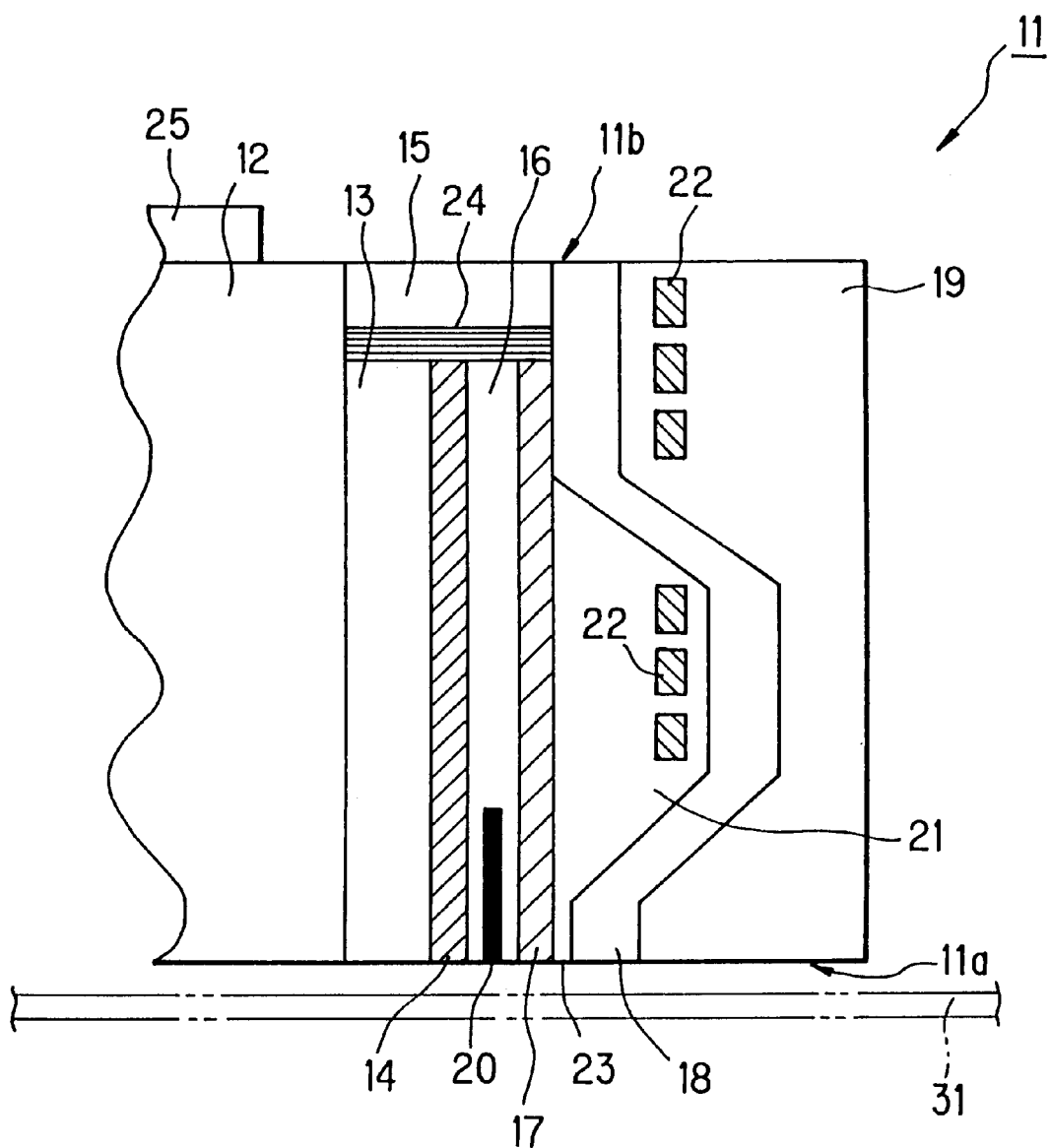
FIG. 1 is a magnified sectional view of a magneto-resistive composite head 11 according to a first embodiment of the invention.

FIG. 1 is a magnified sectional view of a magneto-resistive composite head 11 according to a first embodiment of the invention.

The composite heard 11 of FIG. 1 comprises a first insulation layer 13, a first magnetic shield layer 14, a second insulation layer 16, a second magnetic shield layer 17, a magnetic pole layer 18, and a third insulation layer 19, which are laminated in the order on a side surface of a slider 12.

The second insulation layer 16 is made of an insulation material such as $Al_2O_3$ having a volume resistivity of $10^{14}$ Ω·cm, and the first and the second magnetic insulation layer 14 and 17 and the magnetic pole layer 18 are made of metallic materials.

In the second insulation layer 16 formed between the first and the second magnetic insulation layer 14 and 17, an MR (magneto-resistive) layer 20 is configured so as to align with a facing surface 11a of the composite head 11 facing to the recording surface of the magnetic disk 31. To he MR layer 20, lead patterns are connected for supplying a sense current and the first and the second magnetic shield layer 14 and 17 and the MR layer 20 compose a reproduction head.

The second magnetic shield layer 17 is configured as a straight plane and a center part of the magnetic pole layer 18 is configured to form a concave plane. In a space formed between the second magnetic layer 17 and the magnetic pole layer 18, a fourth insulation layer 21 is configured. The second magnetic shield layer 17 and the magnetic pole layer 18 are magnetoelectrically connected with each other at their upper (of the drawing) ends, and their lower ends are aligned with the facing surface 11a being separated a little so as to make a magnetic gap 23. Thus configured, the second magnetic shield layer 17 and the magnetic pole layer 18 compose a recording head functioning as a pair of magnetic poles having the magnetic gap 23 between them. Traversing the third and the fourth insulation layer 19 and 21, a write coil 22 is configured and the write signal flows therein.

In the composite head 11 according to the first embodiment, a conductive member 24 is provided at an tipper surface 11b (opposite to the facing surface 11a) covering upper ends of the first insulation layer 13, the first magnetic shield layer 14, the second insulation layer 16 and the second magnetic shield layer 17. Both ends of the conductive member 24 are electrically connected to the side surface of slider 12 and the upper part of the magnetic pole 18, respectively. In the embodiment of FIG. 1, an insulation material 15 is configured on the conductive member 24. However, the conductive member 24 may be exposed directly to the air without providing the insulation material 15. Tile conductive member 24 is made of paramagnetic conductive material and electrically connects the first and the second magnetic shield 14 and 17 to the slider 12 made of conductive material such as AlTiC having volume resistivity of about 2,000 to 3,000 µΩ·cm.

To the upper surface (opposite to the facing surface 11a) of the slider 12, a suspension 25 is connected electrically and mechanically, 20 and the slider 12 is supported by a carriage (not depicted in FIG. 1) through the suspension 25. Therefore, the conductive member 24 is grounded by way of the slider 12, the suspension 25 and the carriage.

As to the conductive member 24, it is also made of conductive paramagnetic material having volume resistivity of under 100 µΩ·cn, such as gold (volume resistivity 2 µΩ·cm) or copper, making use of a thin film forming process.

Figure 2A:
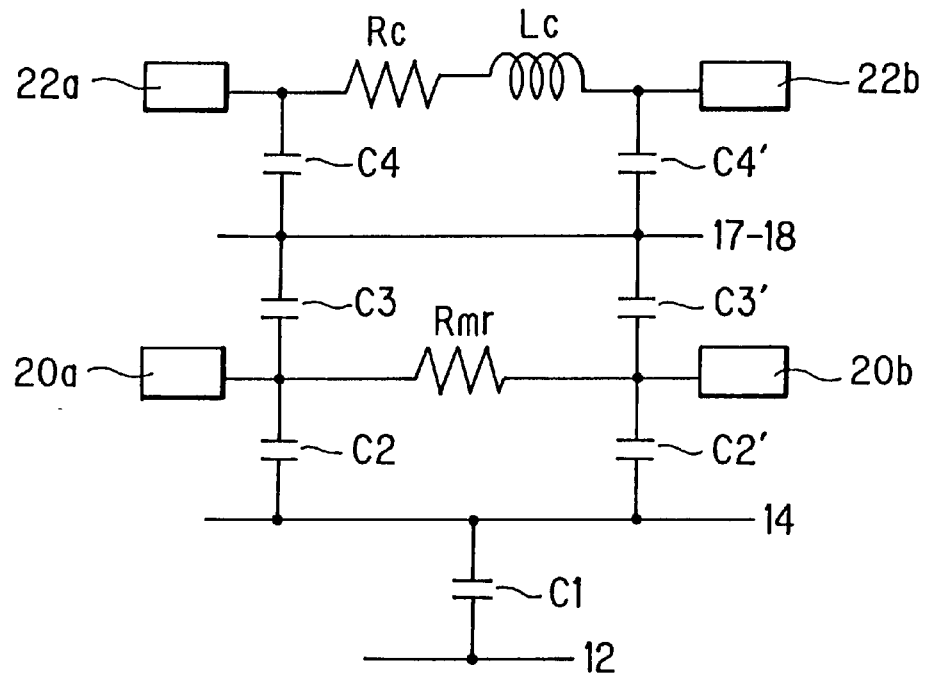
FIG. 2A is a circuit diagram schematically illustrating an equivalent circuit of the conventional composite head.
Figure 2B:
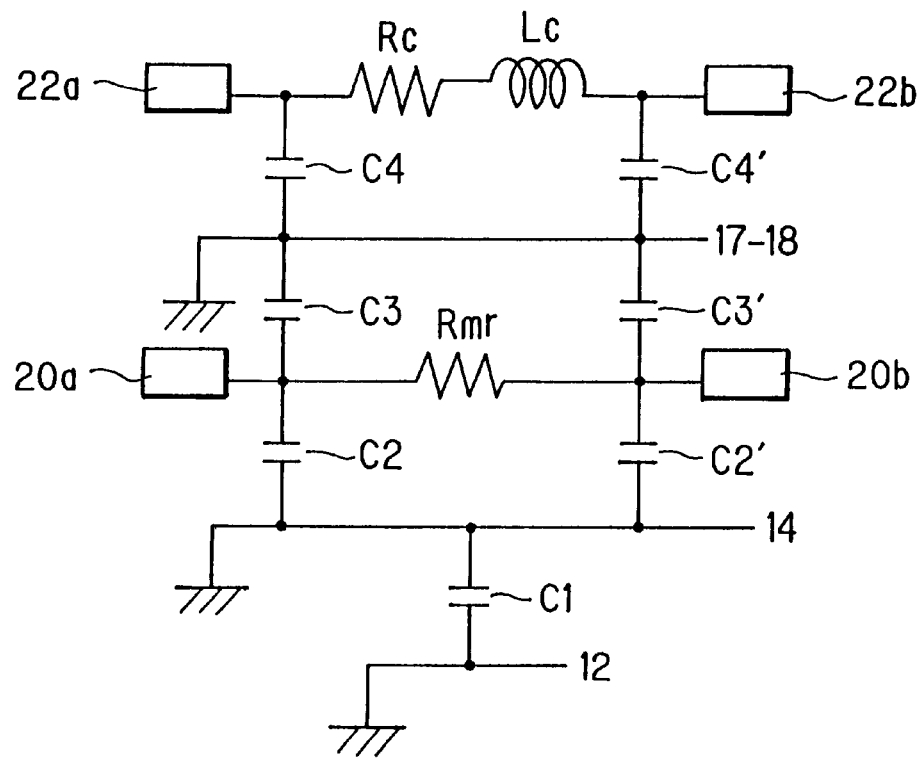
FIG. 2B is a circuit diagram schematically illustrating the equivalent circuit of the composite head 11 according to the embodiment of FIG. 1.

Now, functions of the composite head 11 is described referring to FIGS. 2A and 2B.

Figure 6:
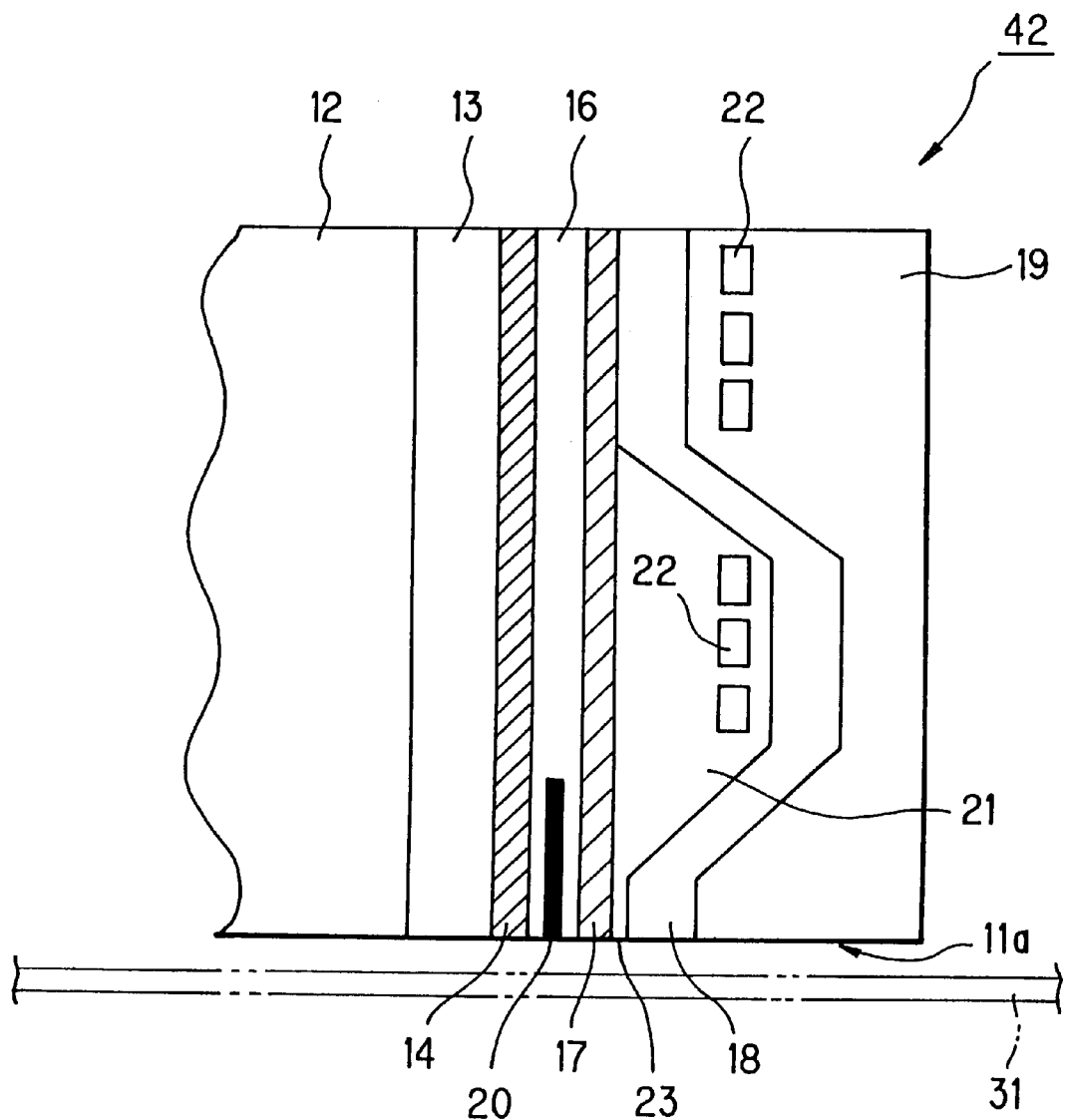
FIG. 6 is a magnified sectional view of the conventional composite head.

FIG. 2A is a circuit diagram schematically illustrating an equivalent circuit of the conventional composite head 42 of FIG. 6 and FIG. 2B is that of the composite head 11 according to the embodiment of FIG. 1.

In the equivalent circuit of FIG. 2A, the write coil 22 of FIG. 6 is represented by a coil resistance Rc and a coil inductance Lc serially connected between terminals 22a and 22b, and the MR layer 20 is represented by a MR resistance Rmr connected between terminals 20a and 20b. The second magnetic shield layer 17 and the magnetic pole layer 18, which are connected electrically, are represented by a conductive line 17–18 in the same way with the first magnetic shield layer 14 and the slider 12 of FIG. 6 represented by conductive lines 14 and 12, respectively.

In the conventional composite head 42 of FIG. 6, the slider 12, the first magnetic shield layer 14, the MR layer 20, a connection of the second magnetic shield 17 and the magnetic pole layer 18, and the write coil 22 are electrically isolated from each other with the first, the second, the third and the fourth insulation layer 13, 16, 19 and 21, 20 which are represented by parasitic capacitance C1, C2, C2', C3, C3', C4 and C4'.

On the other hand, the slider 12, the first and the second magnetic shield layer 14 and 17 and the magnetic pole layer 18 are electrically connected with each other by way of the conductive member 24 and grounded through the slider 12 and the suspension 25 in the composite head 11 of the embodiment of FIG. 1, which is represented by grounding of the conductive lines 12, 14 and 17–18 in the equivalent circuit of FIG. 2B.

Therefore, the static electricity to be charged in the composite head 11, which is equivalent to electricity to be charged in the parasitic capacitance C1, C2, C2', C3, C3', C4 and C4', is evacuated to the ground by way of the conductive member 24 from the first and the second magnetic shield layer 14 and 17 and the magnetic pole layer 18 through the slider 12 and the suspension 25, affecting nothing to the MR layer 20.

Further, the electric discharge from the magnetic disk 31 towards the composite head 11, which may occur at the CSS or the sliding of the composite head 11 with the magnetic disk 31, is prevented to reach to the MR layer 20, flowing to the ground through either of the first and the second magnetic shield layer 14 and 17 without affecting the MR layer 20. This is because thickness of the first or the second magnetic shield layer 14 or 17 is about 3 µm and far larger than thickness of the MR layer 20 which is about 30 µm, and the first and the second magnetic layer 14 and 17 are directly grounded through good conductors such as the slider 12 and the conductive member 24.

As heretofore described, the first and the second magnetic shield layer 14 and 17, and the magnetic pole layer 18 are all electrically connected to the slider 12 by way of the conductive member 24 and grounded through good conductors. Hence, even when the static electricity charged in the magnetic disk 31 is discharged towards the composite head 11, the discharge current is grounded without affecting the MR layer 20, and therefore, the MR layer 20 can be surely prevented from break or degradation due to melting because of the discharge current, enabling to heighten reliability of the magnetic disk device.

Furthermore, the spacing between the MR layer 20 and the magnetic disk 31 can be still reduced, evading as well the electric discharge towards the MR layer 20 according to the first embodiment, which enables further improvement of the resolution ability and consequently, recording density of the magnetic disk device.

Now, a composite head 11' according to a second embodiment of the invention will be described.

Figure 3:
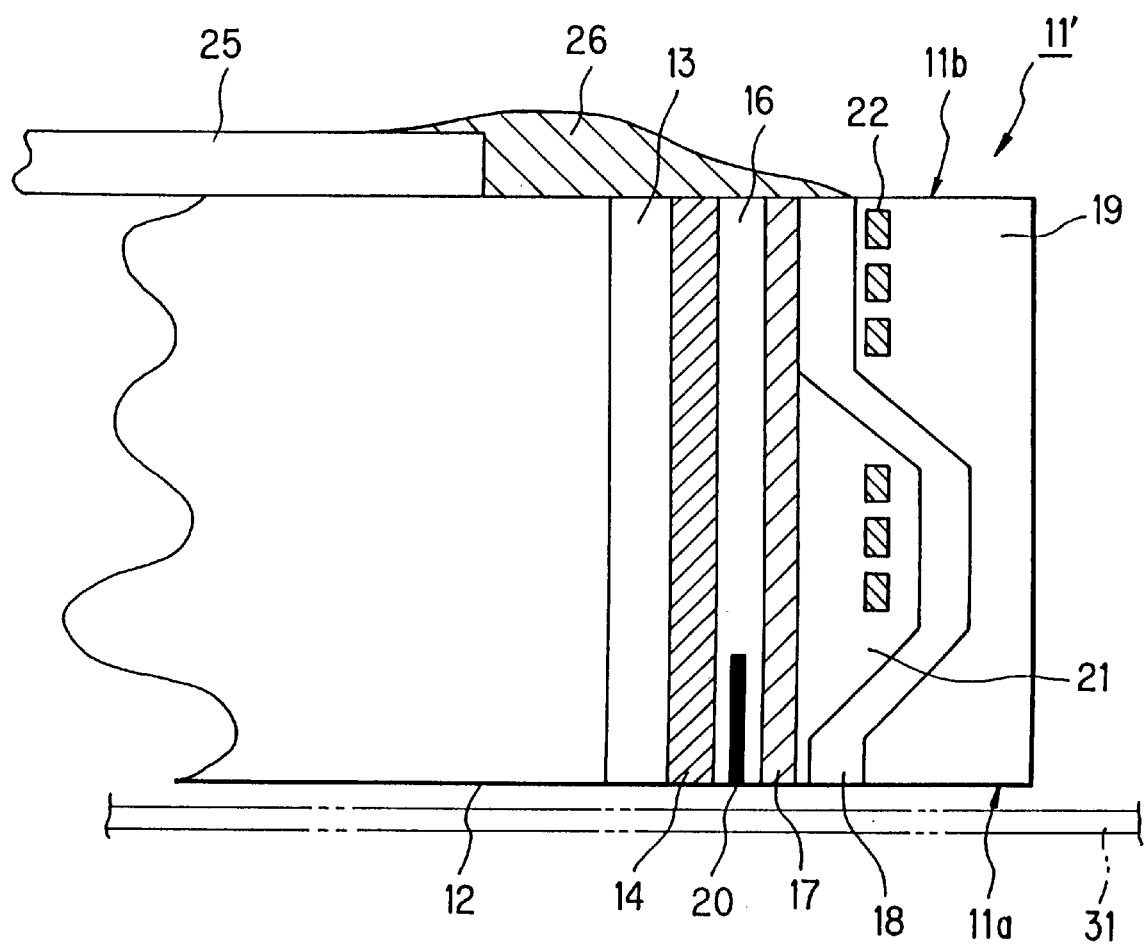
FIG. 3 is a magnified sectional view of a composite head 11' according to a second embodiment of the invention.

FIG. 3 is a magnified sectional view of the composite head 11' having a configuration similar to the composite head 11 of FIG. 1.

In the composite head 11' of FIG. 3, upper ends of the first and the second magnetic shield layer 14 and 17 and the first and the second insulation layer 13 and 16 are extended until the upper surface 11b of the composite head 11' so as to align with other layers, and the upper ends of the first and the second magnetic shield layer 14 and 17 and the magnetic pole layer 18 are electrically connected making use of a conductive resin 26 to the suspension 25 which is connected to the upper surface of the slider 12. In FIG. 3, the conductive resin 26 is depicted to be extended over the upper end of the magnetic pole layer 18. However, the conductive resin 26 is sufficient to be electrically connected with the first and the second magnetic shield layer 14 and 17, extending onto the second magnetic shield layer 17.

In the composite head 11' of FIG. 3, the first and the second magnetic shield layer 14 and 17 are grounded by way of the conductive resin 26, instead of the conductive member 24 of FIG. 1, giving the same equivalent circuit of FIG. 2B and the same effect with the composite head of FIG. 1.

Further, according to the second embodiment of FIG. 3, no special thin film forming process should be added to the fabrication processes of the conventional composite head. Therefore, the second embodiment has a merit to reduce the fabrication cost, compared to the first embodiment of FIG. 1.

Still further, the conductive resin 26 can connect the first and the second magnetic shield layer 14 and 17 directly to the suspension 25. Therefore, the discharge current is effectively prevented from flowing through the MR head 20, by applying a material having higher conductivity than the slider 12 to the suspension 25, such as stainless steel (volume resistivity of 100 to 200 $\mu\Omega\cdot$cm).

In the following paragraphs, a composite head 11" according to a third embodiment is described.

Figure 4:
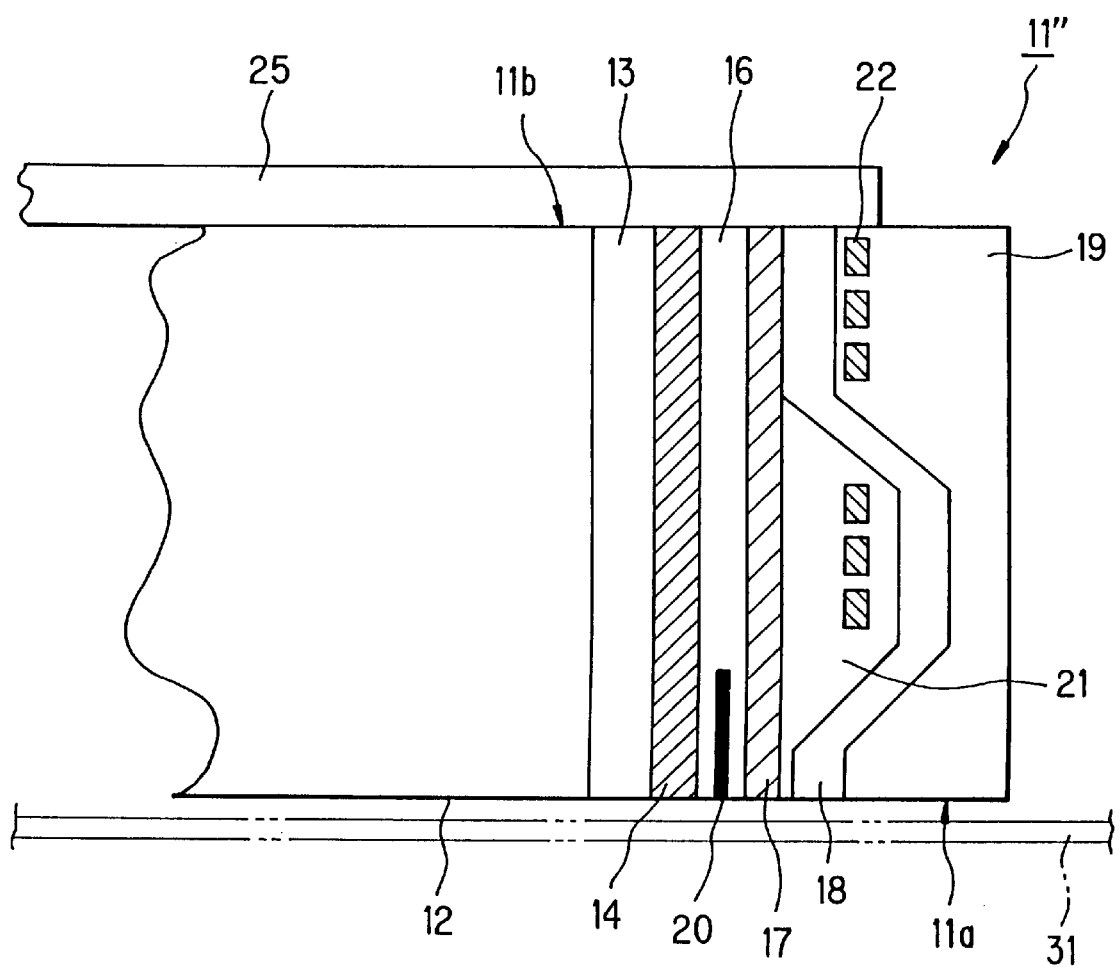
FIG. 4 is a magnified sectional view of a composite head 11" according to a third embodiment of the invention.
Figure 5:
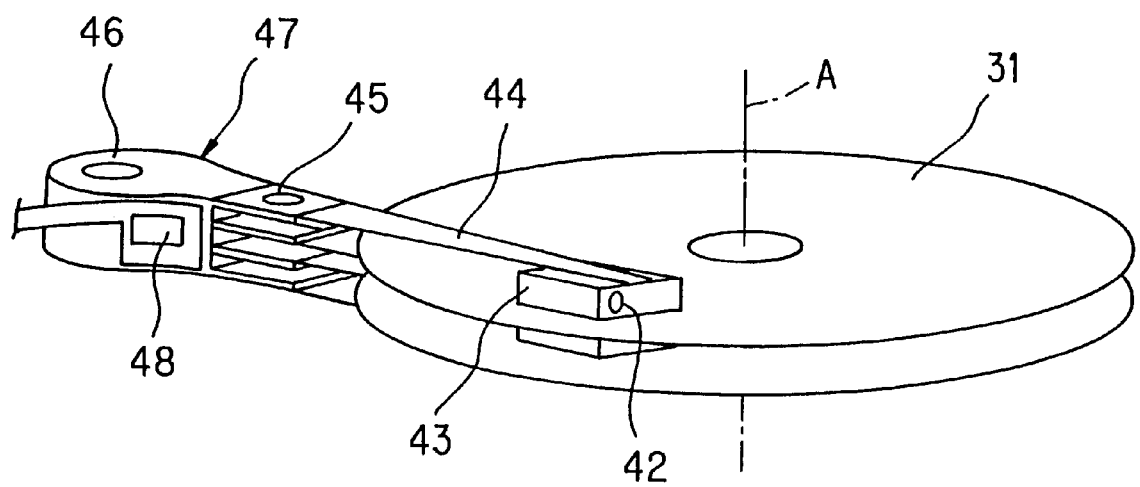
FIG. 5 is a perspective view illustrating an example of a magnetic disk device.

FIG. 4 is a magnified sectional view of the composite head 11" having a configuration similar to the composite head 11' of FIG. 3.

In the composite head 11" of FIG. 4, upper ends of the first and the second magnetic shield layer 14 and 17 and the first and the second insulation layer 13 and 16 are extended until the upper surface 11b of the composite head 11" so as to align with other layers in the same way with the composite head 11' of FIG. 3, and the upper ends of the first and the second magnetic shield layer 14 and 17 and the magnetic pole layer 18 are electrically connected directly to the suspension 25 which is extended onto upper end of the third insulation layer 19. In FIG. 4, the suspension 25 is depicted to be extended over the upper end of the third insulation layer 19. However, the suspension 25 is sufficient to be electrically connected with the first and the second magnetic shield layer 14 and 17, extending onto the second magnetic shield layer 17.

Also in the composite head 11" of FIG. 4, the first and the second magnetic shield layer 14 and 17 are grounded through the suspension 25, giving the same equivalent circuit of FIG. 2B and the same effect with the composite head of FIG. 1 or FIG. 3.

Furthermore, the discharge current can be evacuated directly to the suspension 25 having high conductivity, without passing through the conductive resin. Therefore, a discharge current route having still higher conductivity being provided, the break or the degradation of the MR layer 20 due to the discharge current can be prevented more surely than the second embodiment of FIG. 3.

Heretofore, the present invention is described in connection with some embodiments. However, it can be easily understood that a variety of modifications of the embodiments can be considered in the scope of the invention.

In the magneto-resistive composite head according to the invention damages to the magneto-resistive element due to discharge currents of static electricity can be surely prevented with a simple configuration, as heretofore described, enabling to improve reliability of magnetic disk devices using the magneto-resistive composite head.

What is claimed is:

1. A magneto-resistive composite head having a reproduction head comprising a magneto-resistive element provided between a first and a second magnetic shield layer formed on a side surface of a slider supported by a suspension; wherein the first and the second magnetic shield layer are designed to be grounded through the suspension; and further comprising:

a conductive member for electrically connecting the first and the second magnetic shield layer to the slider which is electrically connected to the suspension, the conductive member being formed at an upper surface of the magneto-resistive composite head opposite to a facing surface facing to a magnetic disk.

2. A magneto-resistive composite head as recited in claim 1; wherein the conductive member is covered with an insulation layer.

3. A magneto-resistive composite head having a reproduction head comprising a magneto-resistive element provided between a first and a second magnetic shield layer formed on a side surface of a slider supported by a suspension; wherein the first and the second magnetic shield layer are designed to be grounded through the suspension; and further comprising:

conductive resin for electrically connecting the first and the second magnetic shield layer to the slider which is electrically connected to the suspension, the conductive resin adhering to an upper surface of the magneto-resistive composite head opposite to a facing surface to face a magnetic disk.

4. A magnetic disk device having a suspension, a slider supported by the suspension, and a magneto-resistive composite head configured on a side surface of the slider and having a reproduction head comprising a magneto-resistive element provided between a first and a second magnetic shield layer formed on the side surface of the slider; wherein the first and the second magnetic shield layer are designed to be grounded through the suspension, said magneto-resistive composite head further comprising:

a conductive member for electrically connecting the first and the second magnetic shield layer to the slider which is electrically connected to the suspension, the conductive member being formed at an upper surface of the magneto-resistive composite head opposite to a facing surface facing to a magnetic disk.

5. A magnetic disk device as recited in claim 4; wherein the suspension is designed to connect electrically to the first and the second magnetic shield layer at an upper surface of the magneto-resistive composite head opposite to a facing surface facing to a magnetic disk.

* * * * *